(12) United States Patent
Jagadeesan et al.

(10) Patent No.: US 7,539,492 B2
(45) Date of Patent: May 26, 2009

(54) SYSTEM AND METHOD FOR PROVIDING A HANDOFF LEG ASSOCIATED WITH A PREEXISTING LEG IN A NETWORK ENVIRONMENT

(75) Inventors: Ramanathan T. Jagadeesan, San Jose, CA (US); Bich T. Nguyen, Los Altos, CA (US); Andrew C. Chung, Fremont, CA (US); Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 78 days.

(21) Appl. No.: 11/003,205

(22) Filed: Dec. 3, 2004

(65) Prior Publication Data

US 2006/0121902 A1    Jun. 8, 2006

(51) Int. Cl.
*H04Q 7/20* (2006.01)
*H04Q 7/00* (2006.01)

(52) U.S. Cl. ................ 455/436; 455/442; 370/331

(58) Field of Classification Search ........... None
See application file for complete search history.

(56) References Cited

U.S. PATENT DOCUMENTS

| | | | |
|---|---|---|---|
| 5,577,029 A | 11/1996 | Lu et al. ............... 370/54 |
| 5,664,007 A * | 9/1997 | Samadi et al. .......... 455/442 |
| 5,887,256 A | 3/1999 | Lu et al. .............. 455/426 |
| 5,920,818 A * | 7/1999 | Frodigh et al. ......... 455/443 |
| 5,943,332 A | 8/1999 | Liu et al. ............. 370/342 |
| 6,002,679 A | 12/1999 | Liu et al. ............. 370/335 |
| 6,016,318 A | 1/2000 | Tomoike ............... 370/401 |
| 6,141,545 A | 10/2000 | Begeja et al. .......... 455/417 |
| 6,181,928 B1 | 1/2001 | Moon ................. 455/415 |
| 6,405,040 B1 | 6/2002 | Liu et al. ............. 455/435 |
| 6,411,632 B2 | 6/2002 | Lindgren et al. ........ 370/466 |
| 6,539,237 B1 | 3/2003 | Sayers et al. .......... 455/555 |
| 6,546,425 B1 | 4/2003 | Hanson et al. ......... 709/227 |
| 6,611,689 B1 | 8/2003 | Cartigny et al. ........ 455/461 |
| 6,647,426 B2 | 11/2003 | Mohammed ........... 709/238 |
| 6,687,360 B2 | 2/2004 | Kung et al. ........... 379/211.02 |
| 6,748,054 B1 | 6/2004 | Gross et al. .......... 379/88.12 |

(Continued)

OTHER PUBLICATIONS

"Notification of Transmittal of the International Search Report and the Written Opinion of the International Searching Authority, or the Declaration" in International Application Filing No. PCT/US05/40228 filed on Nov. 4, 2005 (12 pages), mailed Feb. 21, 2007.

(Continued)

*Primary Examiner*—Nick Corsaro
*Assistant Examiner*—Joel Ajayi
(74) *Attorney, Agent, or Firm*—Baker Botts L.L.P.

(57) ABSTRACT

A method for facilitating communications between wireless networks is provided that includes communicating with a mobile station and transferring a communication session from a first wireless link to a second wireless link. The mobile station is operable to negotiate a first wireless link with a first wireless network, to establish a communication session with a device using the first wireless link, and to facilitate a session handoff with a second wireless link with the second wireless network using the second wireless interface. The handoff is enabled by associating the first wireless link to the second wireless link.

14 Claims, 3 Drawing Sheets

U.S. PATENT DOCUMENTS

| | | | |
|---|---|---|---|
| 6,771,953 B1 | 8/2004 | Chow et al. | 455/417 |
| 6,807,431 B2 | 10/2004 | Sayers et al. | 455/555 |
| 6,826,173 B1 | 11/2004 | Kung et al. | 370/352 |
| 6,888,808 B2 | 5/2005 | Jagadeesan et al. | 370/328 |
| 6,961,559 B1 | 11/2005 | Chow et al. | 455/414.1 |
| 2001/0046214 A1 | 11/2001 | Kang | 370/328 |
| 2002/0082019 A1 | 6/2002 | Sunay et al. | 455/442 |
| 2002/0152319 A1 | 10/2002 | Amin et al. | 709/232 |
| 2003/0014367 A1 | 1/2003 | Tubinis | 705/64 |
| 2003/0134638 A1 | 7/2003 | Sundar et al. | 455/435 |
| 2003/0134650 A1 | 7/2003 | Sundar et al. | 455/465 |
| 2003/0224795 A1 | 12/2003 | Wilhoite et al. | 455/445 |
| 2004/0002335 A1 | 1/2004 | Pan et al. | 455/439 |
| 2004/0037324 A1 | 2/2004 | Heubel et al. | 370/493 |
| 2004/0087307 A1 | 5/2004 | Ibe et al. | 455/436 |
| 2004/0127208 A1 | 7/2004 | Nair et al. | 455/420 |
| 2004/0146021 A1 | 7/2004 | Fors et al. | 370/331 |
| 2004/0160909 A1* | 8/2004 | Sheynblat | 370/328 |
| 2004/0246990 A1* | 12/2004 | Krishnamurthi et al. | 370/466 |
| 2004/0248615 A1* | 12/2004 | Purkayastha et al. | 455/552.1 |
| 2004/0266426 A1 | 12/2004 | Marsh et al. | 455/426.2 |
| 2005/0037757 A1* | 2/2005 | Moon et al. | 455/436 |
| 2005/0070288 A1* | 3/2005 | Belkin et al. | 455/439 |

OTHER PUBLICATIONS

J. Rosenberg, "A Session Initiation Protocol (SIP) Event Package for Registrations," Network Working Group, RFC 3680, 22 pgs, Mar. 2004.

M. Garcia-Martin, E. Henrikson, and D. Mills, "Private Header (P-Header) Extensions to the Session Initiation Protocol (SIP) for the 3rd-Generation Partnership Project (3GPP)," Network Working Group, RFC 3455, 29 pgs, Jan. 2003.

Global System for Mobile Communications," 3rd Generation Partnership Project; Technical Specification Group Services and System Aspects; Report on alternative architectures for combining CS Bearers with IMS; Release 6," http://www.3gpp.org, 28 pgs, 2004.

* cited by examiner

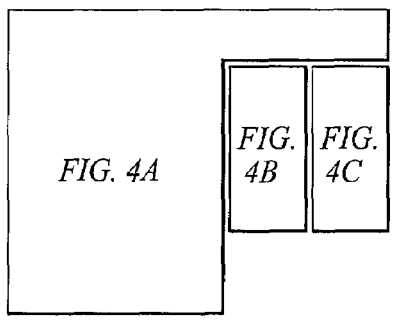
FIG. 4
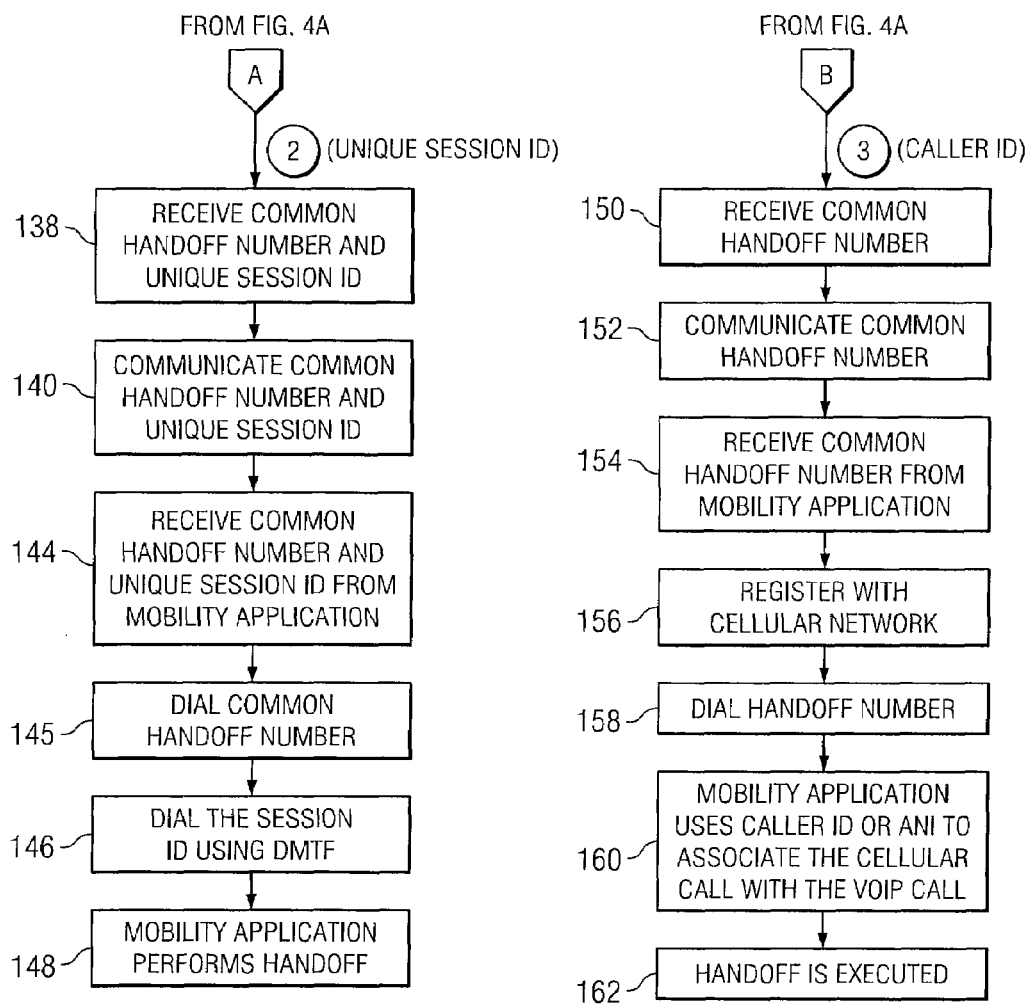
FIG. 4B
FIG. 4C

SYSTEM AND METHOD FOR PROVIDING A HANDOFF LEG ASSOCIATED WITH A PREEXISTING LEG IN A NETWORK ENVIRONMENT

TECHNICAL FIELD OF THE INVENTION

The present invention relates generally to network communications, and, more particularly, to a system and a method for providing a handoff leg associated with a preexisting leg in a network environment.

BACKGROUND OF THE INVENTION

Networking architectures have grown increasingly complex in communications environments. In addition, the augmentation of clients or end users wishing to communicate in various network environments has caused many networking configurations and systems to respond by adding elements to accommodate the increase in networking traffic and the various enhancements that have been provided by numerous communicative platforms. In recent years, a series of protocols and architectures have been developed in order to accommodate a diverse group of end users having various needs. Some of these protocols relate to issues associated with handoffs (sometimes referred to as handovers).

As both public and private network systems grow in size and in sophistication, proper routing and efficient management of communication sessions and data flows becomes even more critical. In cases where protocols are unable to accommodate a given flow, an end user is precluded from enjoying the benefits of a given communication architecture. Advances in technology have resulted in the deployment of various types of wireless networks. However, while most of these wireless networks often provide service to adjacent and/or overlapping physical spaces, most cellular and enterprise network protocols are incompatible. Accordingly, the ability to provide an effective mechanism to properly process, handoff, and direct communications for an end user seeking to realize the benefits provided by multiple network environments offers a significant challenge to network operators, component manufacturers, and system designers.

SUMMARY OF THE INVENTION

In accordance with the present invention, techniques for supporting handoff between cellular and enterprise wireless networks are provided. According to some embodiments, these techniques enable a mobile station to maintain a communication session that is handed between cellular and enterprise wireless networks. In particular, these techniques can enable a mobile station, alone or in combination with a mobility application, to produce a handoff leg association with a pre-existing call leg.

According to a particular embodiment, a method for facilitating communications between wireless networks is provided that includes communicating with a mobile station and transferring a communication session from a first wireless link to a second wireless link. The mobile station is operable to negotiate a first wireless link with a first wireless network, to establish a communication session with a device using the first wireless link, and to facilitate a session handoff with a second wireless link with the second wireless network using the second wireless interface. The handoff is enabled by associating the first wireless link to the second wireless link.

More particular embodiments of the present invention include the use of one or more of the following: a unique session ID, a unique handoff number, caller ID or automatic number identification values, and dual tone multi-frequency (DTMF) codes. These items may be used to provide an effective association between two call legs (e.g. a cellular call and a voice over IP (VoIP) call). In addition, certain operations performed by a mobility application unit or device may also be associated with authentication procedures, whereby authcodes are exchanged with an associated mobile station.

Embodiments of the invention provide various technical advantages. For example, one or more of the techniques may provide for an effective handoff to allow a mobile station to roam between cellular and enterprise wireless networks. According to some embodiments, these techniques may reduce cost and increase performance by empowering the mobile station to select between available networks. Furthermore, by utilizing both cellular and enterprise networks, a mobile station may increase its range of use. In addition, handoff between cellular and enterprise networks may be provided with little or no change to service provider networks and/or enterprise networks. Also, these techniques may be used without modification of signal protocols and without dependence upon any existing signal protocol. Furthermore, using the disclosed techniques, trust boundaries between service providers and enterprises may be preserved.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
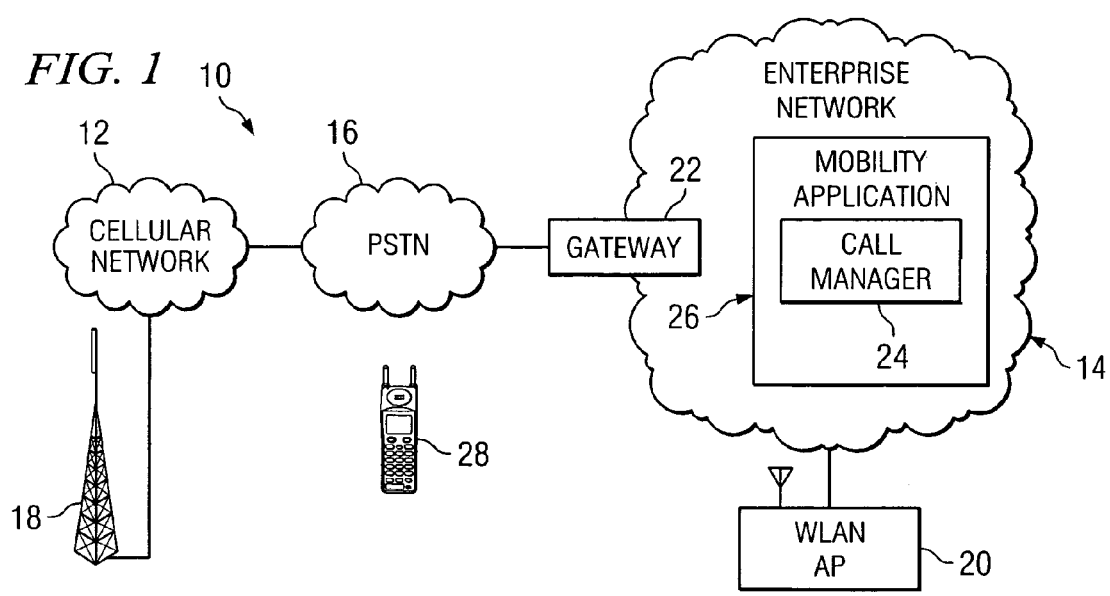
FIG. 1 illustrates a communication system having elements that support handoff between cellular and enterprise wireless networks.

FIG. 1 is a simplified block diagram that illustrates a communication system, indicated generally at 10, for executing an effective handoff between two call legs, which may exist in a network environment. In addition, communication system 10 provides various techniques for associating related call legs. Some of these operations may relate to feature-based handoffs, (e.g. park/transfer/etc.), while others may relate to make-before-break scenarios that do not necessarily use any feature for handoff. In make-before-break scenarios, a new call (or call) is made (successfully) before the old call (or leg) is torn down.

Communication system 10 comprises a cellular network 12 and an enterprise network 14 interconnected through public switched telephone network (PSTN) 16. One or more base stations 18 couple to cellular network 12, and one or more access points 20 couple to enterprise network 14. Enterprise network 14 includes a gateway 22, a call manager 24, and a mobility application 26. System 10 also includes mobile station 28. In general, mobile station 28 may communicate with a remote device through cellular network 12 using base station 18 and/or through enterprise network 14 using access point 20. The elements of system 10 can operate to permit mobile station 28 to maintain a communication session that is handed between cellular network 12 and enterprise network 14. According to particular embodiments, mobility application 26 and/or mobile station 28 utilize one or more of various private branch exchange (PBX) functions to effect handoff between cellular network 12 and enterprise network 14.

Communication system 10 executes an effective and a superlative handoff, whereby the call is anchored in enterprise network 14 (e.g. via mobility application 26). When a call is placed, the call lands on mobility application 26, which recognizes, and is aware of, the call. Hence, when mobile station 28 moves to cellular network 12, mobility application 26 receives a "silent call" from mobile station 28 and, in response to the silent call, mobility application 26 collaborates with call manager 24 to switch (or to transfer [on the fly]) the call. In a similar, reciprocal fashion, when mobile station 28 moves back to enterprise network 14 it communicates with mobility application 26, which transfers the call from a cellular call leg to a voice over IP (VoIP) call leg.

The transfer can be executed in several ways, but the net effect of the transfer is that a real-time protocol (RTP) stream remains constant such that voice traffic can be understood. The RTP stream is essentially switched back and forth from a voice gateway and the VoIP handset platform. One problem associated with this operation is that when a call is made to mobility application 26 (which is generally anchoring the call), mobility application 26 needs to coordinate or associate multiple call legs (i.e. match a VoIP call to a cellular call). The situation can be even more challenging when mobile station 28 is roaming.

In accordance with the teachings of the present invention, communication system 10 addresses these issues and others in the following manner. Mobility application 26 provides handoff services for multiple calls to multiple dual mode phones (e.g. mobile station 28). When mobility application 26 receives a handoff-call via cellular network 12, it needs to identify the particular dual-mode phone and to recognize the active call in order to perform the handoff.

Several methods are provided herein to achieve this goal. (Note that each of these methods is detailed below with reference to FIG. 4, however a brief discussion is offered here in order to provide an overview of these processes).

The first process is associated with a unique handoff-number. In the first process, mobility application 26 maintains a pool of E.164 DNs and it can assign a unique handoff-DN. Thus, mobility application 26 can select one number from the pool of numbers and assign this DN to the dual-mode phone: either for the duration of the call or for a duration of a handoff transaction. On receiving the handoff-call, mobility application 26 uses the handoff-DN (on which it received the call) to lookup the ongoing active call for handoff. For example, the dual-mode phone may send a handoff-request message with the call ID of the active call, whereby mobility application 26 selects a unique handoff-DN and returns it to the phone in the handoff-response.

Mobility application 26 maintains the binding between the handoff-DN and the call-ID of the active call from the dual-mode. Mobile station 28 (i.e. the dual-mode phone) places a call to the handoff-DN. When this call is received by mobility application 26, it looks up the binding between the DN on which it received the call and the call-ID to determine the active call for the handoff.

The second process is associated with a unique session-ID and the second process implements use of SMS or any of the signaling channel (e.g. use of dual tone multi-frequency (DTMF) codes). In this method, mobility application 26 may assign the same handoff-DN to more than one mobile station. A unique session-ID is used to identify the dual-mode phone and the ongoing active call for the handoff. The session-ID may be agreed upon earlier, for example, during call-setup. Mobility application 26 maintains a binding between the session-ID and the active call. Mobile station 28 may use DTMF to signal the session-ID to mobility application 26 when it is in cellular network 12. For example, for a wireless local area network (WLAN) cell handoff, mobile station 28 makes a cell call to the handoff-number and then dials the session-ID using DTMF. Mobility application 26 uses the detected session-ID to bind the handoff call to the ongoing active call. When mobile station 28 initiates or receives a call when it is in cellular network 12, it may generate the session-ID, and transmit it to mobility application 26 using DTMF.

The third process is related to a caller-ID/calling line identification (CLI)/automatic number identification (ANI) scenario. In this process, mobility application 26 may issue the same handoff-DN to more than one dual-mode phone (e.g. mobile station 28) and, further, use the caller-ID of the dual-mode phone (cell-number) to identify the ongoing active call to handoff. Mobility application 26 maintains a binding between the dual-mode phones cellular-DN and the active call from that dual-mode phone. When the call comes in to a handoff-DN at mobility application 26, it uses the caller-ID to determine the active call for handoff.

In an alternative embodiment, an authentication procedure may also be executed. In this scenario, the process is used to authenticate a handoff call to the handoff-DN with any of the above association methods. The dual-mode phone and mobility application 26 can use an auth-code for authentication. The auth-code may be statically configured, or it may be agreed upon by mobility application 26 and mobile station 28 dynamically (e.g. during handoff signaling at call set-up). The dual-mode phone, after making the handoff-call, dials the auth-code using DTMF and mobility application 26 uses the detected auth-code to authenticate the phone. This method could be used to prevent erroneous or malicious calls to a handoff-DN from triggering a "takeover" handoff of an active call. Note also that any combination of the above methods can be used.

Cellular network 12 represents communications equipment, including hardware and any appropriate controlling logic, for providing wireless telephony services using cellular protocols and technology. Various cellular protocols and technologies may be used by cellular network 12, including but not limited to global system for mobile communications (GSM), time division multiple access (TDMA), code division multiple access (CDMA), and any other appropriate analog or digital cellular protocol or technology. Furthermore, cellular network 12 may utilize signaling system 7 (SS7) protocol for signaling purposes. Cellular network 12 may include any number of base stations 18, as well as base station controllers, mobile switching centers, and other appropriate communications equipment for use in communicating with mobile station 28 and PSTN 16. Thus, as illustrated, cellular network 12 may couple to base station 18 to receive and transmit wireless signals to and from mobile station 28.

Enterprise network 14 represents communications equipment, including hardware and any appropriate controlling logic, for interconnecting elements coupled to enterprise network 14. Thus, enterprise network 14 may represent a local area network (LAN), a wide area network (WAN), and/or any other appropriate form of network. Furthermore, elements within enterprise network 14 may utilize circuit-switched and/or packet-based communication protocols to provide for wireline telephony services. For example, elements within enterprise network 14 may utilize Internet Protocol (IP). In addition, elements within enterprise network 14 may utilize wireless standards such as the 802.11 family of wireless standards to provide for wireless telephony services. Note that the 802.11 family of wireless standards includes, among others, 802.11a, 802.11b, and 802.11g. Enterprise network 14 may also utilize interactive voice response (IVR). Enterprise network 14 may include any number of wireless network devices 20, gateways 22, call managers 24, and other appropriate communications equipment for use in communicating with mobile station 28 and PSTN 16. In the embodiment illustrated, enterprise network 14 includes access point 20, gateway 22, call manager 24, and mobility application 26. Access point 20 represents communications equipment, including hardware and any appropriate controlling logic, for providing wireless access to enterprise network 14. Access point 20 may utilize one or more of the 802.11 standards. However, any appropriate wireless standard or protocol may be used.

Note that both cellular network 12 and enterprise network 14 represent a series of points or nodes of interconnected communication paths for receiving and transmitting packets of information that propagate to or from an end user or mobile station 28. A subscription or an agreement may be provided by either of the networks to offer cellular service to an end user of mobile station 28. Both networks offer a communicative interface between mobile station 28 and any suitable location within or external to communication system 10 and, thus, may be representative of a GPRS service provider or any suitable LAN, WLAN, metropolitan area network (MAN), WAN, virtual private network (VPN), or any other appropriate architecture or system that facilitates communications in a network environment. Each network may implement a user datagram protocol (UDP)/Internet protocol (UDP/IP) communication language protocol in a particular embodiment of the present invention. Communication system 10 may utilize any form of transmission control protocol (TCP)/IP, or alternatively implement any other suitable communications protocol for transmitting and receiving data or information within communication system 10.

Gateway 22 represents communications equipment, including hardware and any appropriate controlling logic, for interconnecting enterprise network 14 with cellular network 12 and/or PSTN 16. Gateway 22 may be used to convert communications between different communication protocols. For example, gateway 22 may convert communications received from cellular network 12 in SS7 protocol to any of various other protocols that may be used by enterprise network 14, such as protocols associated with the an integrated services digital network (ISDN) standard in the case of circuit-switched trunking and H.323, session initiation protocol (SIP), or other appropriate protocols in the case of IP-based trunking.

Call manager 24 represents communications equipment, including hardware and any appropriate controlling logic, for providing telephony services over enterprise network 14. For example, call manager 24 may support voice over IP (VoIP) communications, using any of various protocols such as SIP, signaling connection control point (SCCP) protocol, media gateway control protocol (MGCP), H.323, and/or any other appropriate protocol for VoIP. Furthermore, call manager 24 may act as an IP PBX and support PBX functions, such as hold, park, transfer, redirect, and/or other high level and low level call management features.

Mobility application 26 represents a server in one embodiment of the present invention, but alternatively could be replaced with any other appropriate device (e.g. a router, switch, bridge, gateway, etc.) that facilitates the operations detailed herein. Mobility application 26 includes any suitable collection of hardware, software, and controlling logic to support handoff between cellular network 12 and enterprise network 14. For example, mobility application 26 may, when appropriate, utilize PBX features to effect handoff of a communication session between cellular network 12 and enterprise network 14.

It should also be noted that the internal structure of mobility application 26 and mobile station 28 are malleable and can be readily changed, modified, rearranged, or reconfigured in order to achieve their intended operations as they pertain to the handoff function outlined herein in this document. As identified supra, software and/or hardware may reside in these elements in order to achieve the teachings of the leg association features of the present invention. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structures of mobility application 26 and mobile station 28 in the context of communication system 10 and, accordingly, they should be construed as such.

Note also that any number of additional functions (other than the call association operation detailed herein) may be provided by mobility application 26. For example, one functionality provided by mobility application 26 is to keep track of a feature state (e.g. hold, transfer, conference, etc.). Mobility application 26 may also translate between DTMF feature-codes and IP-PBX VoIP feature invocation, as appropriate. (Note that DTMF represents the system used by touch-tone telephones. DTMF assigns a specific frequency (consisting of two separate tones) to each key so that it can easily be identified by a microprocessor.) This would enable IP-PBX features (e.g. hold, caller ID, display functions, redirect, three-way calling, barge, web browsing, etc.) to be provided to mobile station 28 when the dual-mode phone is in cell network 12: even when there is no simultaneous data path. These operations also offer feature transparency across handoff scenarios. One operation of communication system 10 is to have the feature-invocation from the dual-mode phone. This could be provided by communicating directly with mobility application 26 and, then, having mobility application 26 invoke the feature on the call-leg between mobility application 26 and the IP-PBX/far-end. When the dual-mode phone (e.g. mobile station 28) moves to cell network 12, it invokes features by dialing or initiating the corresponding DTMF codes. Mobility application 26 then maps the codes to the appropriate VoIP feature invocation signaling, and then continues to invoke them on the call-leg between itself and the IP-PBX/far-end.

In operation of an example embodiment, when mobile station 28 goes to cellular network 12, there is a functionality in mobility application 26 that invokes features on the end user's behalf. From an architecture perspective, when mobile station 28 is in enterprise network 14 it can represent itself in such endeavors. However, once mobile station 28 moves to cellular network 12, it can no longer participate in such signaling. Thus, some device or element should offer a phone feature proxy function for mobile station 28 (for the purpose of invoking the feature), as well as for the other participant (called party or calling party). Without such a proxy feature, mobile station 28 becomes a "dumb device" that cannot take full advantage of a number of network capabilities. This phone feature proxy, as well as the leg association feature outlined herein, can reside in mobility application 26 (and/or mobile station 28) or in any other suitable location or element, where appropriate and based on particular needs.

PSTN 16 represents communications equipment, including hardware and any appropriate controlling logic, through which cellular network 12 and enterprise network 14 may communicate. PSTN 16 may include switches, wireline and wireless communication devices, and any other appropriate equipment for interconnecting cellular network 12 and enterprise network 14. PSTN 16 may include portions of public and private networks providing network transport services between various geographic areas and networks.

Mobile station 28 represents a mobile device, including hardware and any appropriate controlling logic, capable of communicating with remote devices through cellular network 12 and enterprise network 14 and maintaining communication sessions with remote devices during handoff between cellular network 12 and enterprise network 14. Mobile station 28 may communicate through cellular network 12 using base station 18 and through enterprise network 14 using access point 20. Furthermore, mobile station 28 may interact with call manager 24 and/or mobility application 26 when appropriate to utilize PBX features to effect handoff between cellular network 12 and enterprise network 14.

In operation, mobile station 28 may initiate and receive telephone calls through cellular network 12 and/or enterprise network 14 to establish communication sessions with remote devices. Note that, as used herein, a remote device refers to any communications device capable of establishing communications sessions with mobile station 28, such as devices located in cellular network 12, enterprise network 14, PSTN 16, or other linked networks. Furthermore, as used herein, a communication session refers to the transfer of voice, video, data, and/or other information between two or more communication devices. For example, according to particular embodiments a communication session may involve a call between two communication devices or a conference call involving two or more communication devices.

When mobile station 28 is in an area serviced by cellular network 12 and/or enterprise network 14, callers who dial a telephone number or other appropriate identifier of mobile station 28 may initiate a communication session with mobile station 28 through an appropriate network. Similarly, mobile station 28 may dial a telephone number or other appropriate identifier of a remote device and initiate a communication session with the remote device through an appropriate network. Thus, mobile station 28 may function in two modes simultaneously or separately. For example, when in an area serviced by access point 20, mobile station 28 may act as an 802.11 wireless telephony device. When in an area serviced by base station 18, mobile station 28 may act as a cellular phone. These areas may or may not overlap.

Given the capability of mobile station 28 to place and receive calls through at least two networks, this presents at least four scenarios for initiation of a communication session. In a first scenario, mobile station 28 initiates a communication session by placing a call through enterprise 14 using a wireless link with access point 20. In a second scenario, mobile station 28 initiates a communication session through cellular network 12 using a wireless link with base station 18. Note that in either scenario, mobile station 28 may couple to a single remote device or to a conference call involving multiple remote devices. In a third scenario, a remote device initiates a communication session with mobile station 28, where mobile station 28 receives signaling and data through cellular network 12 using base station 18. In a fourth scenario, a remote device initiates a communication session with mobile station 28, where mobile station 28 receives signaling and data through enterprise network 14 using access point 20. Again, the communication session may be associated with a single remote device or with a conference call, and the remote device or devices may be located in cellular network 12 and/or enterprise network 14.

At any point in time, mobile station 28 may determine to handoff a communication session from cellular network 12 to enterprise network 14 or from enterprise network 14 to cellular network 12. For example, after establishing a communication session, mobile station 28 may lose or begin to lose connectivity with base station 18 or access point 20. Signal degradation may occur due to various causes. For example, mobile station 28 may begin to lose wireless connectivity due to physical movement. When possible, mobile station 28 may switch between using base station 18 and access point 20 for communications. Moreover, in certain circumstances mobile station 28 may maintain a communication session during handoff between cellular network 12 and enterprise network 14.

Handoff may occur when mobile station 28 travels from an area serviced by cellular network 12 to an area serviced by enterprise network 14. Handoff may also occur in the opposite direction, when mobile station 28 travels from an area serviced by enterprise network 14 to an area serviced by cellular network 12. However, handoff may occur at any other appropriate time. For example, handoff may occur when mobile station 28 is located in an area serviced by both network types due to a predetermined preference of one type of network, due to a spontaneous choice of a user of mobile station 28, or in response to analyzing error rates or other data associated with signaling provided by one or both types of networks. For example, error rates may be associated with signal strengths of base station 18 and access point 20, and may be dependent upon a location of mobile station 28.

In general, mobile station 28 and/or mobility application 26 may utilize PBX features such as hold, park, transfer, redirect, and other high level and low level PBX functions to provide for handoff between cellular network 12 and enterprise network 14. Mobile station 28 may couple to call manager 24 or mobility application 26 through parallel call legs through two networks. The PBX feature may be used to terminate use of an old call leg and initiate use of a new call leg to effect handoff of a communication session from the old call leg to the new call leg.

One PBX feature that may be used to effect handoff is the park feature. The park feature may be provided in two forms, undirected park and directed park. In undirected park, when a communication session is parked, a serving system such as call manager 24 may dynamically assign a park number associated with the parked communication session and report the park number to the entity parking the communication session. In directed park, the entity parking the communication session may select a park number to be associated with the communication session to be parked. To utilize directed park, the entity parking the communication session may monitor a set of park numbers to determine an available park number to prevent simultaneous use of any of the park numbers. Both park variants may be utilized to support handoff of communication sessions.

Consider mobile station 28 having a call established through access point 20 and enterprise network 14 to a remote device. Any of the four embodiments discussed above or a combination or modification of the embodiments may be used to effect handoff of the call. The call includes at least two call legs, a first leg between mobile station 28 and enterprise network 14, and a second leg between enterprise network 14 and the remote device. Mobile station 28 may determine to utilize cellular network 12. For example, when exiting an area serviced by access point 20, mobile station 28 may detect a session handoff trigger such as a degradation in quality of communications through the first leg. In response to this or another session handoff trigger, mobile station 28 or mobility application 26 may use the park feature to park the call. For example, mobile station 28 may park the second call leg with call manager 24. As another example, mobile station 28 may request that mobility application 26 park the second call leg. This action may be called the park operation. Note that the first call leg may be dropped at any appropriate time. However, according to particular embodiments, the fist call leg is maintained as long as the call has not been parked. Furthermore, according to particular embodiments, the first call leg may be maintained until a new call leg is created.

Mobile station 28 and/or mobility application 26 may utilize base station 18 to create a new call leg through cellular network 12 to call manager 24 or mobility application 26. For example, mobile station 28 may dial a telephone number associated with mobility application 26. As another example, mobility application 26 may dial a telephone number associated with mobile station 28. After creating the new call leg, the park feature may then be used to couple the new call leg to the parked call. In other words, the new call leg may be coupled to the second call leg to allow mobile station 28 to resume communications with the remote device. This action may be called the park retrieval operation.

In some embodiments, anchoring a communication session in enterprise network 14 may provide for control of the communication session during handoff. Anchoring a communication session in enterprise network 14 represents routing signaling through enterprise network 14. When signaling and data flow to mobile station 28 through base station 18, anchoring the communication session in enterprise network 14 may be particularly useful, since enterprise network 14 might otherwise be excluded from the signaling path. If enterprise network 14 is excluded from the signaling path, mobility application 26 and call manager 24 cannot process handoff of the communication session.

Various methods may be used to anchor a communication session in enterprise network 14. Calls placed to mobile station 28 may be anchored in enterprise network 14. For example, cellular network 12 may be provisioned to route calls directed to the telephone number of mobile station 28 to enterprise network 14. Furthermore, mobility application 26 may control the cellular number associated with mobile station 28. Mobility application 26 may indicate to cellular network 12 when mobile station 28 is registered with enterprise network 14 so that when calls are made to the telephone number, cellular network 12 will obtain a handoff number associated with enterprise network 14 from mobility application 26. In addition, a separate enterprise telephone number may be associated with mobile station 28 so that calls to the separate enterprise telephone number will route through enterprise network 14, which can extend the call to mobile station 28 through cellular network 12.

After receiving a telephone call intended for mobile station 28, call manager 24 and/or mobility application 26 may include itself in a signaling path associated with the resulting communication session, whether the signaling path proceeds through cellular network 12 or enterprise network 14. Note that when a remote device exists outside enterprise network 14, for example on cellular network 12, and mobile station 28 is outside of a coverage area of access point 20, hair pinning media through gateway 22 may be appropriate. That is, media communicated to gateway 22 from the remote device may be routed to mobile station 28 without requiring the media to pass through enterprise network 14. Similarly, media communicated to gateway 22 from mobile station 28 may be routed to the remote device without requiring the media to pass through enterprise network 14.

Calls placed by mobile station 28 may be anchored in enterprise network 14 by first seeking to utilize enterprise network 14 when a user of mobile station 28 dials a telephone number. To the extent mobile station 28 is in an area serviced by access point 20, any communication session may be anchored in enterprise network 14 by utilizing access point 20. When mobile station 28 is located outside the area serviced by access point 20, mobile station 28 may first couple to mobility application 26 through cellular network 12. For example, cellular network 12 may be provisioned to redirect calls into enterprise network 14. Mobility application 26 may then couple mobile station 28 to the intended remote device by dialing the phone number on behalf of mobile station 28. Alternatively or in addition, mobile station 28 may dial an IVR service provided by enterprise network 14. A user of mobile station 28 may then use the IVR service to dial the target number.

Anchoring a call in enterprise network 14 may allow mobile station 28 alone or in combination with mobility application 26 to invoke PBX features within enterprise network 14, such as PBX features controlled by call manager 24, to effect handoff between enterprise network 14 and cellular network 12. For example, consider the case in which a caller in PSTN 16 calls mobile station 28 while mobile station 28 is an area serviced by base station 18. In this case, if the phone number of mobile station 28 is associated with enterprise network 14, call signaling travels through PSTN 16 and enters enterprise network 14 through gateway 22. Gateway 22, alone or in combination with call manager 24 and/or mobility application 26, extends the call back through PSTN 16 and cellular network 12 to mobile station 28. Using appropriate communications, mobile station 28 or mobility application 26 may invoke a PBX feature when appropriate to effect handoff from cellular network 12 to enterprise network 14. For example, if mobile station 28 enters or is located in an area serviced by access point 20, and mobile station 28 desires to utilize enterprise network 14, steps may be taken to effect handoff from cellular network 12 to enterprise network 14 using a PBX feature hosted by enterprise network 14. According to a particular embodiment, dial tone multi-frequency (DTMF) signals may be communicated to mobility application 26 or call manager 24 to invoke a PBX feature.

Note that communication system 10 represents one embodiment of a system that supports handoff between cellular and enterprise wireless networks. Various alternative embodiments are possible. For example, while in the illustrated embodiment enterprise network 14 couples to cellular network 12 through PSTN 16 using gateway 22, various other embodiments may include enterprise network 14 coupling to cellular network 12 in other ways. For example, enterprise network 14 may couple to cellular network 12 using a service provider that supports VoIP. Thus, in alternative embodiments, cellular network 12 and gateway 22 may not be included in communication system 10.

Figure 2:
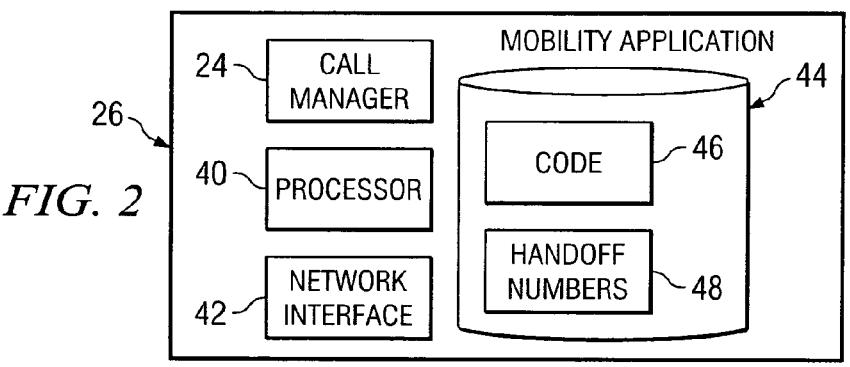
FIG. 2 is a block diagram illustrating functional components of a mobility application from the communication system.

FIG. 2 is a block diagram illustrating functional components of mobility application 26. In the embodiment illustrated, mobility application 26 includes call manager 24, as well as a processor 40, a network interface 42, and a memory 44. These functional elements can operate to support handoff of active communication sessions when mobile station 28 roams between cellular network 12 and enterprise network 14.

Processor 40 controls the operation and administration of elements within mobility application 26. For example, processor 40 operates to process information received from network interface 42 and memory 44. Processor 40 includes any hardware and/or logic elements operable to control and process information. For example, processor 40 may be a programmable logic device, a microcontroller, and/or any other suitable processing device.

Network interface 42 communicates information to and receives information from devices coupled to enterprise network 14. For example, network interface 42 may communicate with gateway 22, call manager 24, and access point 20. Furthermore, network interface 42 may receive information from and transmit information to remote devices as well as mobile station 28. Thus, network interface 42 includes any suitable hardware or controlling logic used to communicate information to or from elements coupled to mobility application 26.

Memory 44 stores, either permanently or temporarily, data and other information for processing by processor 40 and communication using network interface 42. Memory 44 includes any one or a combination of volatile or nonvolatile local or remote devices suitable for storing information. For example, memory 44 may include random access memory (RAM), read only memory (ROM), magnetic storage devices, optical storage devices, or any other suitable information storage device or a combination of these devices. As illustrated, memory 44 may include one or more memory modules, such as code 46 and handoff numbers 48.

Code 46 includes software, executable files, and/or appropriate logic modules capable when executed to control the operation of mobility application 26. For example, code 46 may include executable files capable of supporting handoff between cellular network 12 and enterprise network 14. Code 46 may include instructions to enable mobility application 26 to utilize PBX features to redirect incoming call legs to parked communication sessions. Handoff numbers 48 include E.164 telephone numbers that mobility application 26 may use and/or provide to mobile station 28 for use in effecting handoff between cellular network 12 and enterprise network 14. For example, mobility application 26 may be assigned static E.164 numbers for handoff purposes.

In operation, network interface 42 may receive an indication from mobile station 28 that mobile station 28 intends to utilize a second network, for example cellular network 12. In some embodiments, processor 40 may communicate a handoff number selected from handoff numbers 48 to mobile station 28 through network interface 42.

Note that mobility application 26 may utilize session description protocol (SDP) to bridge media. Use of SDP may provide for more secure handoff by associating incoming legs with parked legs only when SDP identifiers match. Furthermore, mobility application may use any appropriate protocol to communicate with other elements of system 10. For example, mobility application 26 may utilize Java telephony application programming interface (JTAPI) to interact with call manager 24.

While this example includes specific functional components for mobility application 26, mobility application 26 may include any collection and arrangement of components, including some or all of the enumerated functional components, for supporting handoff between cellular network 12 and enterprise network 14. Moreover, mobility application 26 contemplates implementing each of the functional components using any suitable combination and arrangement of hardware and/or logic, and implementing any of the functionalities using a computer program stored on a computer-readable medium. Furthermore, mobility application 26 may be implemented as a stand-alone device, or aspects of mobility application 26 may be distributed among various devices within enterprise network 14. Alternatively, in some embodiments mobility application 26 may be incorporated into call manager 24.

Figure 3:
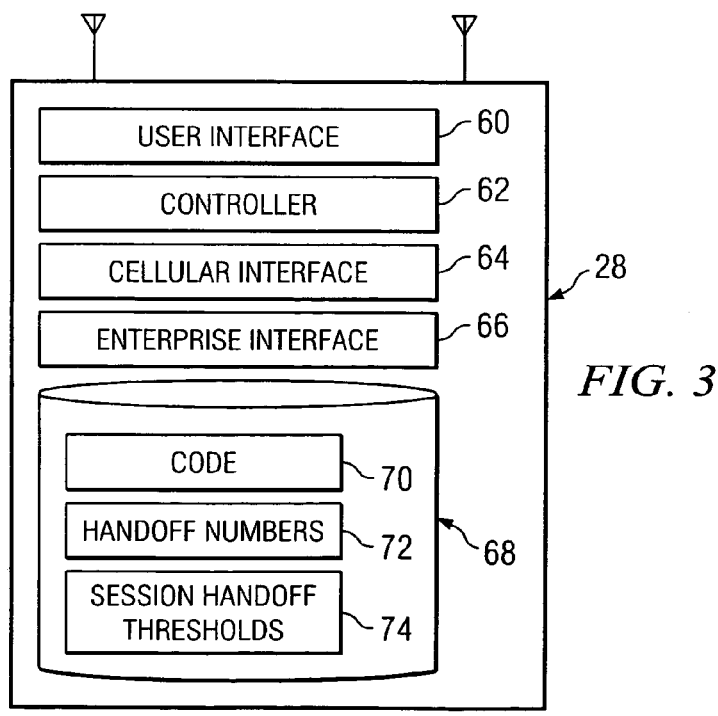
FIG. 3 is a block diagram illustrating functional components of a mobile station from the communication system.

FIG. 3 is a block diagram illustrating functional components of mobile station 28. In the embodiment illustrated, mobile station 28 includes a user interface 60, a controller 62, a cellular interface 64, an enterprise interface 66, and a memory 68. In general, mobile station 28 may establish communication sessions with remote devices through interaction with cellular network 12 and/or enterprise network 14. Moreover, mobile station 28 may effect handoff between cellular network 12 and enterprise network 14.

User interface 60 allows a user of mobile station 28 to input information into mobile station 28 and receive information outputted by mobile station 28. For example, user interface 60 may receive audio information from a user of mobile station 28. User interface 60 may also allow the user to dial telephone numbers and select from various features made available by mobile station 28. In addition, audio information may be outputted by user interface 60 to the user. Thus, user interface 60 may include a microphone, speaker, keypad, and/or other appropriate devices for inputting and outputting information.

Controller 62 controls the operation and administration of the elements within mobile station 28. For example, controller 62 operates to process information and/or commands received from user interface 60, cellular interface 64, enterprise interface 66, and memory 68. Controller 62 includes any hardware and/or logic elements operable to control and process information. For example, controller 62 may be a microcontroller, processor, programmable logic device, and/or any other suitable processing device.

Cellular interface 64 communicates information to and receives information from cellular network 12. For example, cellular interface 64 may communicate and receive audio information and signaling data associated with telephone calls placed through cellular network 12. Thus, cellular interface 64 includes any suitable hardware or controlling logic used to communicate information to or from elements coupled to mobile station 28.

Enterprise interface 66 communicates information to and receives information from enterprise network 14. For example, enterprise interface 66 may communicate and receive audio information and signaling data associated with telephone calls placed through enterprise network 14. Thus, enterprise interface 66 includes any suitable hardware or controlling logic used to communicate information to or from elements coupled to mobile station 28.

Note that, as illustrated, mobile station 28 includes multiple antennas. Use of multiple antennas may allow mobile station 28 to simultaneously couple to multiple wireless networks. For example, a first antenna couple to cellular interface 64 to provide for communication with cellular network 12, while a second antenna may couple to enterprise interface 66 to provide for communication with enterprise network 14.

However, mobile station 28 may include any number of antennas, including one antenna, to provide for simultaneous and/or serial communications with various networks.

Memory 68 stores, either permanently or temporarily, data and other information for processing by controller 62 and communication using user interface 60, cellular interface 64, and/or enterprise interface 68. Memory 68 includes any one or a combination of volatile or nonvolatile devices suitable for storing information. For example, memory 68 may include RAM, ROM, magnetic storage devices, optical storage devices, or any other suitable information storage device or a combination of these devices. As illustrated, memory 68 may include one or more memory modules, such as code 70, handoff numbers 72, and session handoff thresholds 74.

Code 70 includes software, executable files, and/or appropriate logic modules capable when executed to control the operation of mobile station 28. For example, code 70 may include executable files capable of effecting handoff between cellular network 12 and enterprise network 14. Code 70 may include instructions to enable mobile station 28 to place stealth calls to create new call legs for handoff purposes. Code 70 may also include instruction to enable mobile station 28 to utilize PBX features such as park to handoff communication sessions from one network to another. Handoff numbers 72 include E.164 telephone numbers that mobile station 28 may use to effect handoff between cellular network 12 and enterprise network 14. For example, mobile station 28 may dial E.164 numbers to place stealth calls. Session handoff thresholds 74 include data, such as acceptable and unacceptable error rates associated with communication sessions. Session handoff thresholds 74 may be used by mobile station 28 to determine when to seek handoff between cellular network 12 and enterprise network 14. More specifically, session handoff thresholds 74 may specify thresholds for use when mobile station 28 has an active communication session.

In operation, controller 62 may maintain registration with call manager 24 when mobile station 28 is located within an area serviced by access point 20. Controller 62 may operate to communicate voice data received through user interface 60 as well as signaling data through base station 18 and/or access point 20 to cellular network 12 and/or enterprise network 14. Controller 62 may also operate to communicate voice data received through cellular interface 64 and/or enterprise interface 66 to a user of mobile station 28 through user interface 60. In addition, controller 62 may use session handoff thresholds 74 to determine when to effect handoff between cellular network 12 and enterprise network 14. For example, controller 62 may determine that an session handoff threshold 74 associated with communication session using enterprise interface 66 has been exceeded, and controller 62 may register with cellular network 12 using cellular interface 64 and place a stealth call through cellular network 12 to mobility application 26 using a handoff number 72. Furthermore, controller 62 may communicate commands to call manager 24 and/or mobility application 26 through cellular interface 64 and/or enterprise interface 66 to utilize PBX features for handoff purposes.

While this example includes specific functional components for mobile station 28, mobile station 28 may include any collection and arrangement of components, including some or all of the enumerated functional components, for communicating with remote devices using cellular network 12 and/or enterprise network 14 and effecting handoff between cellular network 12 and enterprise network 14 using PBX features. Moreover, mobile station 28 contemplates implementing each of the functional components using any suitable combination and arrangement of hardware and/or logic. Thus, in one embodiment mobile station 28 is a mobile phone. In other embodiments, mobile station 28 may be a personal digital assistant (PDA), laptop computer, or other device operable to establish communications with cellular network 12 and enterprise network 14.

Figure 4A:
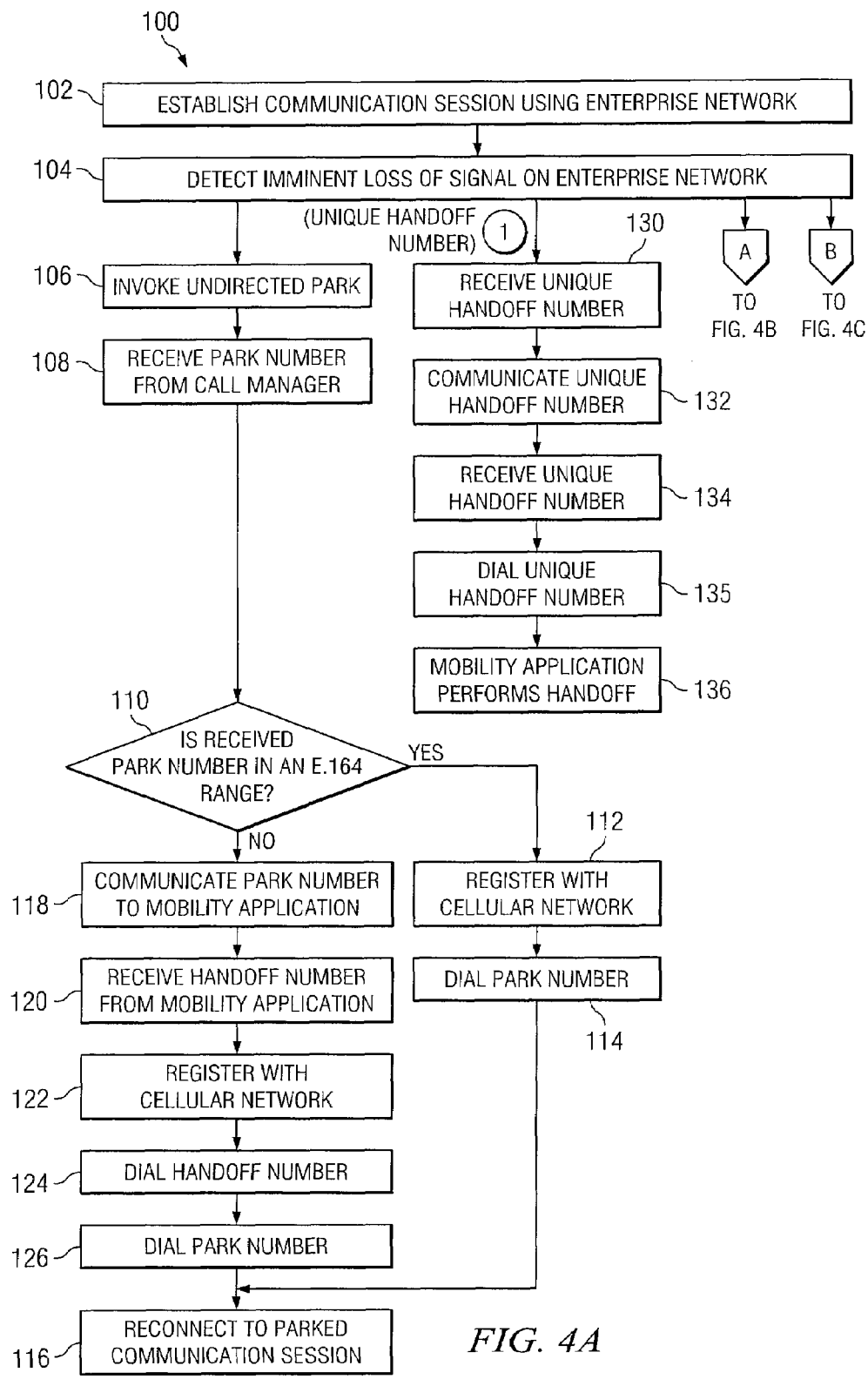
FIG. 4 is a flowchart illustrating several methods for effecting handoff between cellular and enterprise wireless networks.

Prior to discussing FIG. 4, the problems or situations that are being addressed by the proposed flows should be understood. Consider an operation of an example embodiment, where a call associated with mobile station 28 is being properly anchored by mobility application 26. In order to execute a handoff, a new cellular call must be made. Hence, mobile station 28 will make the cellular call over cellular network 12 and to mobility application 26, whereby a switch occurs over to that call leg. Mobility application 26 is handling multiple calls and multiple mobile stations. Hence, mobility application 26 needs to associate that particular call to a given mobile station, particularly in the context of handoff scenarios. A significant obstacle is present in trying to associate a first call (e.g. a cellular call) and a second call (e.g. a VoIP call). This challenge is successfully overcome by the teachings of the present invention, as evidenced by FIG. 4, which is detailed below.

FIG. 4 illustrates several methods for addressing the situation where an incoming cellular call is coming in from mobility application 26 and the call needs to be associated with the existing VoIP call. One way is to use a park code, which is illustrated in the flowchart by steps 102-126.

The park scenario of FIG. 4 illustrates another method 100 for effecting handoff between cellular network 12 and enterprise network 14. Mobile station 28 establishes a communication session with a remote device using enterprise network 14 at step 102. Note that in some embodiments mobile station 28 maintains registration with call manager 24 and/or mobility application 26 while mobile station 28 remains within range of access point 20. Thus, call manager 24 may direct incoming calls intended for mobile station 28 through access point 20 when mobile station 28 is registered, and direct incoming calls intended for mobile station 28 through PSTN 16 when mobile station 28 is not registered. Similarly, a user of mobile station 28 may dial a telephone number and mobile station 28 may communicate signaling information through access point 20 to enterprise network 14 and call manager 24 when mobile station 28 has registered with call manager 24. Note that the remote device associated with the communication session may be located in enterprise network 14 or outside enterprise network 14, such as in PSTN 16 or cellular network 12.

Mobile station 28 may detect eminent loss of signal on the enterprise network 14 at step 104. For example, as discussed above, mobile station 28 may monitor data associated with enterprise network 14 and compare the data with session handoff thresholds 74. Mobile station 28 invokes undirected park at step 106. Undirected park may be invoked by a user of mobile station 28 or automatically by mobile station 28. Mobile station 28 receives a park number from call manager 24 at step 108. At step 110, mobile station 28 determines whether the received park number is in an E.164 range. If the received park number is an E.164 range, mobile station 28 registers with cellular network 12 at step 112 and dials the park number at step 114. At step 116, mobile station 28 is reconnected to the parked communication session.

Returning to step 110, if the received park number is not in an E.164 range, mobile station 28 communicates the park number to mobility application 26 at step 118. At step 120, mobile station 28 receives a handoff number from mobility application 26. The handoff number received may be a dialable number in an E.164 range so that mobile station 28 may use the handoff number to couple to mobility application 26 through cellular network 12. Thus, mobile station 28 registers with the cellular network 12 at step 122 and dials the handoff number at step 124. At step 126, mobility application 26 dials the park number on behalf of mobile station 28. At step 116, mobile station 28 is reconnected to the parked communication session.

In some embodiments, a media break may occur during handoff. However, audio notifications associated with the handoff, such as music on hold, ringing, and other indications and sounds may be suppressed by mobile station 28. Alternatively or in addition, mobile station 28 may communicate information to a user of mobile station 28 that a handoff is occurring. Furthermore, note that method 100 might involve parking the communication session before placing the stealth call. However, in some embodiments, mobile station 28 may place a stealth call before parking the communication session, and only park the communication session after detecting answer by mobility application 26. Using this sequence, the length of the media break may be reduced or eliminated.

Note that method 100 utilizes undirected park. Alternatively or in addition, directed park may be utilized. Using directed park, mobile station 28 may determine available park numbers and select one of the available park numbers for use in handoff. In some embodiments, mobile station 28 and/or particular communication sessions may be assigned specific park numbers to use when appropriate. Furthermore, mobile station 28 may be able to monitor what park numbers are being used at any time. If the selected park number is an E.164 number, when mobile station 28 determines to utilize cellular network 12, mobile station 28 may dial the park number directly. If the park number is not an E.164 number, mobile station 28 may register the park number with mobility application 26, and mobility application 26 may map the park number to an E.164 number for park retrieval.

Method 100 illustrates handoff from enterprise network 14 to cellular network 12. However, handoff from cellular network 12 to enterprise network 14 may occur using similar techniques. In some embodiments, handoff from cellular network 12 to enterprise network 14 may include use of DTMF signals communicated from mobile station 28 to cellular network 12 being converted into a feature indication when mobile station 28 enters an area serviced by access point 20. To utilize DTMF signals to invoke PBX features, communication sessions may be required to anchor in enterprise network 14. After anchoring a communication in enterprise network 14, when mobile station 28 determines that enterprise network 14 may be available, mobile station 28 may provide a sequence of DTMF signals corresponding to a feature activation code. When the DTMF signals traveling through cellular network 14 enter enterprise network 14, the DTMF signals may be converted into a feature activator in order to park the communication session. In the undirected park embodiment, a park number may be communicated via DTMF signals to mobile station 28. In the directed park embodiment, the park number may be provided along with the feature activation code. Mobile station 28 may couple to the parked communication session through a new call leg established through access point 20.

To provide for increased security, park retrievals may be required to be validated before allowing an incoming call leg to be coupled to a parked communication session. For example, an identifier of a calling party may be required to be matched to an identifier of the parking party. Furthermore, utilizing a method including mobility application 26 may allow mobility application 26 to perform a security function without altering a native park feature in call manager 24.

There are three other cases that can achieve the function of properly associating call legs. The three processes are permutations or alternatives of the first process outlined above, but differ in a number of aspects as described in the following discussion. The three processes outlined are identified with number designations: 1, 2, and 3, as is illustrated in FIG. 4. Each of the processes may share the first two steps (step 102 and 104) of the preceding discussion associated with the park feature. The first process (1) relates to using a unique handoff number. This allows for a determination of which active session should be bound to the incoming call. This is because it can be recognized to which number the incoming call is addressed. Thus, a pool of phone numbers exist and when the incoming cellular call is received, it can be properly matched. Recall that the task is to match the incoming cellular call with an existing VoIP call. Hence, a phone number can be dynamically or statically associated with the VoIP call leg. This is identified by step 130, where a unique handoff number is received. At step 132, the unique handoff number is communicated and then properly received at step 134. At step 135, the unique handoff number is dialed. At step 136, mobility application 26 would then use the handoff number to handoff the cellular call to the VoIP leg.

Turning to the second process (2), the second process is associated with using a unique session ID. The second process begins at steep 138 (subsequent to step 104), where a common handoff number and unique session ID are received. At step 140, the common handoff number and unique session ID are communicated and then suitably received from mobility application 26 at step 144. At step 145, the common handoff number is dialed. At step 146, the session ID is dialed, for example, using a DTMF code. At step 148, mobility application 26 then performs an effective handoff.

The third process (3) is associated with a caller ID scenario. The third process similarly picks up from step 104 and then moves to step 150, where the unique handoff number is then communicated. At step 152, the common handoff number is communicated and the common handoff number is then received from mobility application at 154. At step 156, registration with the cellular network occurs and the handoff number is then dialed in step 158. Following these operations, and at step 160, mobility application 26 uses the caller ID or ANI to associate the cellular call with the VoIP call. A proper handoff is then executed in step 162.

The preceding flowcharts illustrate particular methods for effecting handoff between cellular network 12 and enterprise network 14. However, these flowcharts illustrate only exemplary methods of operation. While discussion sometimes focuses on handoff in the enterprise-to-cellular direction, similar techniques may be used to provide for handoff in the cellular-to-enterprise direction. Furthermore, communication system 10 contemplates devices using any suitable techniques, elements, and applications for performing these functions. Thus, many of the steps in the flowcharts may take place simultaneously and/or in different orders than as shown. In addition, the devices may use methods with additional steps or fewer steps, so long as the methods remain appropriate. Moreover, other devices of system 10 may perform similar techniques to support handoff between cellular network 12 and enterprise network 14.

It is critical to note that the stages and steps in FIG. 4 illustrate only some of the possible scenarios and operations that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing handoff functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of gateway 22 could be supplanted by bridges, switches, routers or any other suitable devices that are conducive to network communications. In addition the use of DTMF is only one example signaling protocol. DTMF can be supplanted with SMS or any other signaling channel that is available in the cellular or PSTN network.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method comprising:
   anchoring a call for a mobile station in an enterprise network;
   invoking a private branch exchange (PBX) park feature for parking the call in order to facilitate a handoff of the call to a cellular network, the park feature hosted by the enterprise network;
   receiving from the enterprise network a park number for the park feature;
   determining whether the park number is within range;
   if the park number is within range, calling the park number to reconnect to the parked call; and
   if the park number is not within range:
      sending the park number to the enterprise network to obtain a handoff number; and
      registering with the cellular network to call the handoff number in order to initiate calling of the park number to reconnect to the parked call.

2. The method of claim 1:
   the call comprising a first call leg and a second call leg, the first call leg between the mobile station and the enterprise network, the second call leg between the enterprise network and a remote device; and
   the invoking the park feature for parking the call further comprising:
      the invoking the park feature to park the second call leg.

3. The method of claim 1:
   the call comprising a first call leg and a second call leg, the first call leg between the mobile station and the enterprise network, the second call leg between the enterprise network and a remote device; and
   further comprising:
      initiating creation of a third call leg between the cellular network and the enterprise network; and
      utilizing the park feature to couple the third call leg to the second call leg.

4. The method of claim 1, the registering with the cellular network to call the handoff number in order to initiate calling of the park number further comprising:
   calling of the park number by a mobility application on behalf of the mobile station.

5. The method of claim 1, the invoking the park feature for parking the call further comprising:
   invoking the park feature in response to detecting eminent loss of signal.

6. The method of claim 1, the invoking the park feature for parking the call further comprising:
   sending one or more dial tone multi-frequency (DTMF) signals to invoke the park feature.

7. The method of claim 1, the determining whether the park number is within range further comprising:
   determining whether the park number is within an E.164 range.

8. An apparatus comprising:
   a memory configured to store code; and
   a processor configured to execute the code to:
      anchor a call for a mobile station in an enterprise network;
      invoke a private branch exchange (PBX) park feature for parking the call in order to facilitate a handoff of the call to a cellular network, the park feature hosted by the enterprise network;
      receive from the enterprise network a park number for the park feature;
      determine whether the park number is within range;
      if the park number is within range, call the park number to reconnect to the parked call; and
      if the park number is not within range:
         send the park number to the enterprise network to obtain a handoff number; and
         register with the cellular network to call the handoff number in order to initiate calling of the park number to reconnect to the parked call.

9. The apparatus of claim 8:
   the call comprising a first call leg and a second call leg, the first call leg between the mobile station and the enterprise network, the second call leg between the enterprise network and a remote device; and
   the processor further configured to invoke the park feature for parking the call by:
      the invoking the park feature to park the second call leg.

10. The apparatus of claim 8:
   the call comprising a first call leg and a second call leg, the first call leg between the mobile station and the enterprise network, the second call leg between the enterprise network and a remote device; and
   the processor further configured to:
      initiate creation of a third call leg between the cellular network and the enterprise network; and
      utilize the park feature to couple the third call leg to the second call leg.

11. The apparatus of claim 8, the processor further configured to register with the cellular network to call the handoff number in order to initiate calling of the park number by:

calling of the park number by a mobility application on behalf of the mobile station.

12. The apparatus of claim 8, the processor further configured to invoke the park feature for parking the call by:

invoking the park feature in response to detecting eminent loss of signal.

13. The apparatus of claim 8, the processor further configured to invoke the park feature for parking the call by:

sending one or more dial tone multi-frequency (DTMF) signals to invoke the park feature.

14. The apparatus of claim 8, the processor further configured to determine whether the park number is within range by:

determining whether the park number is within an E.164 range.

\* \* \* \* \*